(12) United States Patent
Hattori et al.

(10) Patent No.: US 9,378,878 B2
(45) Date of Patent: *Jun. 28, 2016

(54) METHOD OF MANUFACTURING HEXAGONAL FERRITE MAGNETIC PARTICLES

(71) Applicant: FUJIFILM Corporation, Minato-ku, Tokyo (JP)

(72) Inventors: Yasushi Hattori, Minami-ashigara (JP); Yoshinori Tamada, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 29 days.

This patent is subject to a terminal disclaimer.

(21) Appl. No.: 14/324,857

(22) Filed: Jul. 7, 2014

(65) Prior Publication Data
US 2015/0010466 A1 Jan. 8, 2015

(30) Foreign Application Priority Data
Jul. 8, 2013 (JP) .................................. 2013-142907

(51) Int. Cl.
*H01F 1/11* (2006.01)
*H01F 1/34* (2006.01)
*H01F 1/36* (2006.01)
*H01F 1/00* (2006.01)
*C01G 49/00* (2006.01)
*H01F 1/01* (2006.01)

(52) U.S. Cl.
CPC .............. *H01F 1/01* (2013.01); *C01G 49/0036* (2013.01); *H01F 1/36* (2013.01); *C01P 2004/64* (2013.01); *C01P 2006/42* (2013.01); *H01F 1/348* (2013.01)

(58) Field of Classification Search
CPC ......... H01F 1/11; H01F 1/112; H01F 1/0054; H01F 1/01; H01F 1/15333; H01F 1/348; H01F 1/36; H01F 41/005; C01G 49/0036; C01G 49/0018; C01G 49/02; C01G 49/06; C01P 2004/64; C01P 2004/84; C01P 2006/42; G11B 5/712; B82Y 25/00; Y10S 428/90

USPC ................ 252/62.51 R, 62.63; 428/402, 403; 423/594.2, 633; 264/611; 427/127
See application file for complete search history.

(56) References Cited

U.S. PATENT DOCUMENTS

| 4,551,260 A | 11/1985 | Hayakawa et al. |
| 4,786,430 A * | 11/1988 | Mair ........................ C01G 1/00 252/62.58 |
| 4,789,494 A | 12/1988 | Aoki et al. |
| 2003/0077382 A1 | 4/2003 | Hong et al. |
| 2010/0238063 A1 * | 9/2010 | Ohkoshi ................ B82Y 30/00 342/1 |
| 2012/0298908 A1 | 11/2012 | Ueyama et al. |

FOREIGN PATENT DOCUMENTS

| JP | 58-126907 A | 7/1983 |
| JP | 60-033218 A | 2/1985 |
| JP | 61-040823 A | 2/1986 |
| JP | 03-265524 A | 11/1991 |
| JP | 04-149031 A | 5/1992 |
| JP | 07-172839 A | 7/1995 |
| JP | 2007-091517 A | 4/2007 |
| JP | 2010-001171 A | 1/2010 |
| JP | 2011-001205 A | 1/2011 |
| WO | 2011/125633 A1 | 10/2011 |

OTHER PUBLICATIONS

Office Action dated Jul. 14, 2015 from the Japanese Patent Office issued in corresponding JP Application No. 2013-142907.

* cited by examiner

*Primary Examiner* — Jonathan Johnson
*Assistant Examiner* — Lynne Edmondson
(74) *Attorney, Agent, or Firm* — Sughrue Mion, PLLC

(57) ABSTRACT

The method of manufacturing hexagonal ferrite magnetic particles comprises applying, in a water-based solution, an adhering matter comprising a glass component and an alkaline earth metal to iron oxide particles to which a surfactant adheres, and calcining the iron oxide particles to which the adhering matter adheres to obtain a calcined product in which a main component that is detected by X-ray diffraction analysis is hexagonal ferrite.

18 Claims, No Drawings

METHOD OF MANUFACTURING HEXAGONAL FERRITE MAGNETIC PARTICLES

CROSS-REFERENCE TO RELATED APPLICATIONS

This application claims the benefit of priority under 35 USC 119 to Japanese Patent Application No. 2013-142907 filed on Jul. 8, 2013, which is expressly incorporated herein by reference in its entirety.

BACKGROUND OF THE INVENTION

1. Field of the Invention

The present invention relates to a method of manufacturing hexagonal ferrite magnetic particles and the hexagonal ferrite magnetic particles provided by the above method. More particularly, the present invention relates to a method of manufacturing hexagonal ferrite magnetic particles that makes it possible to obtain fine particles by inhibiting the aggregation of particles in the step of conversion to ferrite by calcination, and to the hexagonal ferrite magnetic particles that are provided by the above method.

The present invention further relates to a magnetic recording medium comprising a magnetic layer comprising the hexagonal ferrite magnetic particles obtained by the above manufacturing method.

2. Discussion of the Background

Hexagonal ferrite is employed in permanent magnets, and in recent years, has been employed as a magnetic material in magnetic recording media.

The method (coprecipitation method) of using calcination to convert into ferrite a coprecipitate obtained by coprecipitating an iron salt and an alkaline earth metal salt is a known method of manufacturing hexagonal ferrite (see Japanese Unexamined Patent Publication (KOKAI) Heisei No. 7-172839 and Japanese Unexamined Patent Publication (KOKAI) No. 2010-1171, which are expressly incorporated herein by reference in their entirety). The method of obtaining a coprecipitate by forming a reverse micelle (the reverse micelle method) has also been proposed as an improvement of the coprecipitation method (see Japanese Unexamined Patent Publication (KOKAI) No. 2007-91517).

Further, US2003/0077382A1, which is expressly incorporated herein by reference in its entirety, describes obtaining spherical ferrite particles by subjecting iron oxide or the like to adhering with barium or strontium carbonate followed by calcination.

SUMMARY OF THE INVENTION

Due to the increased amount of information being recorded, ever higher recording densities are being demanded of magnetic recording media. To achieve higher recording densities, the size of the magnetic material should be reduced. However, since the particles sinter and aggregate during calcination in the coprecipitation method and reverse micelle method, it is difficult to obtain fine particles.

The same is true of the method described in US2003/0077382A1 because, in this method, calcination is conducted for ferrite conversion.

In this regard, it is proposed in Japanese Unexamined Patent Publication (KOKAI) No. 2007-91517 that sintering be inhibited by conducting calcination after coating the coprecipitate with an alkaline earth metal compound. However, based on investigation by the present inventors, the sintering prevention effect due to the alkaline earth metal compound is not necessarily adequate. To achieve higher density recording, a means of more effectively preventing sintering is required.

An aspect of the present invention provides for a means of manufacturing fine hexagonal ferrite magnetic particles.

To provide the above-stated means, the present inventors conducted extensive research. As a result, they discovered for the first time ever that fine hexagonal ferrite magnetic particles could be obtained by subjecting iron oxide particles to which a surfactant adheres to adhering with an adhering matter comprising a glass component and an alkaline earth metal in a water-based solution, and then calcining the particles.

By contrast, when the above processing up through calcination was conducted without adhering with a surfactant, there were found to be cases in which ferrite conversion did not advance adequately during calcination and it was difficult to obtain hexagonal ferrite following calcination. This was presumed to have occurred because the alkaline earth metal was picked up in the glass and ended up being retained in the adhering matter, preventing the reaction with the iron oxide particle in the interior from progressing adequately and tending to preclude conversion into ferrite. By contrast, the reason why conversion into ferrite could progress adequately when calcination was conducted after adhering with a surfactant on the iron oxide particles as set forth above was thought to be that the surfactant could play the role of causing release of the alkaline earth metal from the adhering matter and promoting its reaction with the particle in the interior. The present inventors surmised that the surfactant may have contributed to preventing densification of the structure of the adhering matter.

The present invention was devised based on the above discovery.

An aspect of the present invention relates to a method of manufacturing hexagonal ferrite magnetic particles, which comprises:

applying, in a water-based solution, an adhering matter comprising a glass component and an alkaline earth metal to iron oxide particles to which a surfactant adheres; and calcining the iron oxide particles to which the adhering matter adheres to obtain a calcined product in which a main component that is detected by X-ray diffraction analysis is hexagonal ferrite.

In an embodiment, the above method comprises subjecting the iron oxide particles to adhering with the adhering matter by:

conducting a first adhering treatment in which iron oxide particles to which a surfactant adheres are subjected to adhering with a glass component; and conducting a second adhering treatment in which the iron oxide particles after the first adhering treatment are subjected to adhering with an alkaline earth metal.

In an embodiment, the glass component is a hydrolysis product of a silicon compound.

In an embodiment, the silicon compound is alkoxysilane.

In an embodiment, the silicon compound is tetraethyl orthosilicate.

In an embodiment, the first adhering treatment is conducted by adding a precursor of the glass component to a water-based solution comprising iron oxide particles to which a surfactant adheres and conducting stirring, to subject the iron oxide particles to adhering with the glass component in the form of a hydrolysis product of the precursor.]

In an embodiment, the surfactant is a quaternary ammonium base-containing compound.

In an embodiment, the surfactant is a salt of a quaternary ammonium cation and a halogen anion.

In an embodiment, the surfactant is cetyltrimethylammonium halide.

In an embodiment, the glass component is a hydrolysis product of tetraethyl orthosilicate and the surfactant is cetyltrimethylammonium halide.

In an embodiment, the second adhering treatment is a treatment by which iron oxide particles after the first adhering treatment are subjected to adhering with an alkaline earth metal salt by adding a precursor of an alkaline earth metal salt and an additional component for converting the precursor into an alkaline metal earth salt to a solution comprising iron oxide particles after the first adhering treatment and conducting stirring.

In an embodiment, the alkaline metal earth salt is a carbonate.

In an embodiment, the alkaline metal earth salt is barium carbonate, the glass component is a hydrolysis product of alkoxysilane, and the surfactant is a quaternary ammonium base-containing compound.

In an embodiment, the alkaline metal earth salt is barium carbonate, the glass component is a hydrolysis product of tetraethyl orthosilicate, and the surfactant is cetyltrimethylammonium halide.

In an embodiment, a base is added in addition to the precursor of the alkaline earth metal salt and the additional component.

In an embodiment, the alkaline earth metal is barium.

In an embodiment, the above method further comprises subjecting the hexagonal ferrite magnetic particles obtained following the calcining to a step of removing the adhering matter.

In an embodiment, the adhering matter is dissolved away by a base.

A further aspect of the present invention relates to hexagonal ferrite magnetic particles provided by the above method.

In an embodiment, the hexagonal ferrite magnetic particles are employed as a magnetic material for magnetic recording.

In an embodiment, the hexagonal ferrite magnetic particles have a particle size ranging from 10 nm to 20 nm.

A further aspect of the present invention relates to a magnetic recording medium comprising a magnetic layer comprising ferromagnetic powder and binder, wherein the ferromagnetic powder is comprised of the above hexagonal ferrite magnetic particles.

An aspect of the present invention makes it possible to provide hexagonal ferrite magnetic particles suitable as a magnetic material of a magnetic recording medium for high-density recording.

Other exemplary embodiments and advantages of the present invention may be ascertained by reviewing the present disclosure.

DETAILED DESCRIPTION OF THE EMBODIMENTS

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

The following preferred specific embodiments are, therefore, to be construed as merely illustrative, and non-limiting to the remainder of the disclosure in any way whatsoever. In this regard, no attempt is made to show structural details of the present invention in more detail than is necessary for fundamental understanding of the present invention; the description making apparent to those skilled in the art how several forms of the present invention may be embodied in practice.

The method of manufacturing hexagonal ferrite magnetic particles according to an aspect of the present invention comprises:

applying, in a water-based solution, an adhering matter comprising a glass component and an alkaline earth metal to iron oxide particles to which a surfactant adheres; and calcining the iron oxide particles to which the adhering matter adheres to obtain a calcined product in which a main component that is detected by X-ray diffraction analysis is hexagonal ferrite.

As set forth above, the manufacturing method according to an aspect of the present invention can provide fine hexagonal ferrite magnetic particles because the adhering matter can play the role of preventing sintering of the particles during calcination without impeding conversion into ferrite.

The manufacturing method will be described in greater detail below. In the present invention, the numbers preceding and succeeding the word "to" denote the minimum value and maximum value, respectively, of a range which includes these values.

Iron Oxide Particles

The iron oxide particles to which the surfactant and the above adhering matter are applied (also referred to as the "starting material particles", hereinafter) are not specifically limited. A commercial product can be employed, or iron oxide particles manufactured by a known method can be employed. For example, it is possible to employ without limitation commercial magnetic powder for magnetic recording such as $\alpha$-iron oxide, $\gamma$-iron oxide, hematite, spinel ferrite, and the like.

The starting material particles are desirably equal to or less than 20 nm in particle size. That is because starting material particles that are equal to or less than 20 nm in particle size can be converted to ferrite by calcination while inhibiting sintering, thereby providing fine hexagonal ferrite magnetic particles. From the perspective of stability of magnetization, the particle size is desirably equal to or greater than 10 nm.

The particle size in the present invention is a value that is measured by the following method.

An H-9000 model transmission electron microscope made by Hitachi is used to photograph the particles at a magnification of 100,000-fold and the photograph is printed on photographic paper at an overall magnification of 500,000-fold to obtain a particle photograph. Target magnetic particle is selected from the particle photograph, the contour of the particle is traced with a digitizer, and the particle size is measured with KS-400 Carl Zeiss image analyzing software. For multiple particles, the average value of the size of 500 particles is calculated as the average particle size.

In the present invention, the size of the particles constituting powder such as a magnetic particle (referred to as the "particle size", hereinafter) is denoted as follows based on the shape of the particles observed in the above particle photograph:

(1) When acicular, spindle-shaped, or columnar (with the height being greater than the maximum diameter of the bottom surface) in shape, the particle size is denoted as the length of the major axis constituting the particle, that is, the major axis length.

(2) When platelike or columnar (with the thickness or height being smaller than the maximum diameter of the plate surface or bottom surface) in shape, the particle size is denoted as the maximum diameter of the plate surface or bottom surface.

(3) When spherical, polyhedral, of unspecific shape, or the like, and the major axis constituting the particle cannot be specified from the shape, the particle size is denoted as the diameter of an equivalent circle. The term "diameter of an equivalent circle" means that obtained by the circle projection method.

Further, the average particle size of the powder is the arithmetic average of the above particle size and is obtained by measuring 500 primary particles as set forth above. A "primary particle" refers to an individual, unaggregated particle of powder.

Adhering Treatment with Surfactant

In the above manufacturing method, the iron oxide particles to which a surfactant adheres are subjected to adhering with the adhering matter described further below, in a water-based solution. In the water-based solution, since the surfactant can adsorb to the surface of the iron oxide particles by means of its hydrophobic groups, the surface of the iron oxide particles can become surrounded by the hydrophilic groups of the surfactant. In this state, when calcination is conducted after adhering with the adhering matter containing a glass component and an alkaline earth metal, ferrite conversion can progress well and hexagonal ferrite magnetic particles can be obtained. The hexagonal ferrite magnetic particles obtained in this manner can become fine particles because sintering during calcination can be inhibited by the adhering matter. The fact that dispersion in the water-based solution can be enhanced by the surfactant can be also thought to contribute to obtaining fine hexagonal ferrite magnetic particles.

From the perspective of obtaining a good effect due to the surfactant, the water-based solution is desirably a solution comprising water as the principal solvent. In the present invention, the term "principal solvent" means a solvent that accounts for equal to or more than 50 weight percent, desirably equal to or more than 70 weight percent, and preferably, equal to or more than 90 weight percent, of the total solvent contained in the solution.

From the perspective of achieving even better dispersion, it is also desirable to conduct a surface modification treatment with a dispersing agent or dispersing adjuvant on the iron oxide particles prior to applying the adhering matter set forth further below. Examples of compounds that are suitable as dispersing agents or dispersing adjuvants are linear unsaturated fatty acids with 3 to 17 carbon atoms, such as oleic acid, and linear unsaturated fatty acids with 16 to 18 carbon atoms, such as oleylamines. The quantity of such compounds that can be employed is not specifically limited and can be suitably adjusted.

A cationic surfactant, anionic surfactant, nonionic surfactant, or amphoteric surfactant can be employed as the surfactant. A cationic surfactant is an example of a desirable surfactant, and a quaternary ammonium base-containing compound (quaternary ammonium salt surfactant) is preferred.

Examples of quaternary ammonium salt surfactants are the compounds denoted by the general formula given below. The R in the quaternary ammonium cation denoted by —N$^+$R$_3$ is, for example, an alkyl group having 1 to 5 carbon atoms, desirably a linear alkyl group having 1 to 3 carbon atoms. The three instances of R can each be different, any two can be identical, or all three can be identical.

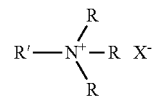

The anion X$^-$ forming a salt with the ammonium cation is not specifically limited. From the perspective of availability, halogen anions such as Cl$^-$ and Br$^-$ are suitable.

From the perspective of obtaining fine hexagonal ferrite magnetic particles, the quaternary ammonium salt surfactant above is desirably an aliphatic compound in which R' in the above general formula denotes an aliphatic group. The aliphatic group denoted by R' is desirably a linear or branched alkyl group. The number of carbon atoms in the aliphatic group is suitably about 10 to 20. The aliphatic group can also optionally contain substituents such as halogen atoms and the like. When the aliphatic group denoted by contains a substituent, the number of carbon atoms in the substituent refers to the number of carbon atoms of the portion excluding the substituent. From the perspectives of availability and particle size reduction, cetyltrimethylammonium bromide (CTAB) is preferred. The quantity of surfactant employed can be suitably adjusted based on the quantity of starting material particles in the solution and the size of the starting material particles so that the surface of the starting material particles is adequately covered.

The processing of adhering of the starting material particles with a surfactant can be conducted, for example, by admixing surfactant and an optional organic solvent to a solution containing the starting material particles and water. The organic solvent can be employed in the form of any ratio of ketones such as acetone, methyl ethyl ketone, methyl isobutyl ketone, diisobutyl ketone, cyclohexanone, isophorone, and tetrahydrofuran; alcohols such as methanol, ethanol, propanol, butanol, isobutyl alcohol, isopropyl alcohol, and methylcyclohexanol; esters such as methyl acetate, butyl acetate, isobutyl acetate, isopropyl acetate, ethyl lactate, and glycol acetate; glycol ethers such as glycol dimethyl ether, glycol monoethyl ether, and dioxane; aromatic hydrocarbons such as benzene, toluene, xylene, cresol, and chlorobenzene; chlorinated hydrocarbons such as methylene chloride, ethylene chloride, carbon tetrachloride, chloroform, ethylene chlorhydrin, and dichlorobenzene; N,N-dimethylformamide; and hexane.

Adhering Treatment with Adhering Matter

In the above manufacturing method, the starting material particles to which a surfactant adheres are subjected to adhering with an adhering matter containing a glass component and an alkaline earth metal. Thus, as set forth above, sintering of the particles in the calcination that is subsequently conducted can be inhibited and fine hexagonal ferrite magnetic particles can be obtained. However, although particle sintering can be inhibited when conducting calcination after applying the adhering matter to the starting material particles to which no surfactant adheres, the reaction (conversion into ferrite) between the alkaline earth metal in the adhering matter and the iron oxide in the interior sometimes does not progress smoothly, making it difficult to obtain hexagonal ferrite. By contrast, in the above manufacturing method, the surfactant is thought to play the role of promoting the reaction between the alkaline earth metal that is contained in the adhering matter and the iron oxide in the interior. As a result, the above manufacturing method makes it possible to obtain fine hexagonal ferrite magnetic particles.

From the perspective of getting the ferrite conversion to proceed smoothly, the quantity of the alkaline earth metal in the adhering matter is desirably two or more, preferably three or more, times the quantity of the alkaline earth metal required by the stoichiometric composition of the hexagonal ferrite to be obtained. Additionally, even when the alkaline earth metal is present in a concentration exceeding saturation, it is not retained in the adhering matter and may end up flowing out into the water-based solution. From this perspective, the concentration of the alkaline earth metal in the adhering matter is desirably a five-fold quantity or less, preferably a four-fold quantity or less.

The adhering matter need only contain a glass component and an alkaline earth metal. The glass component and the alkaline earth metal can simultaneously or successively adhere to the starting material particles. Alkaline earth metals may have the property of being readily picked up in glass. Thus, from the perspective of the adhering efficiency of the alkaline earth metal, the alkaline earth metal desirably adheres (second adhering treatment) after adhering with the glass component on the starting material, particles (first adhering treatment).

The first and second adhering treatments will be described in turn below.

The first adhering treatment is a treatment in which a glass component adheres to iron oxide particles to which a surfactant adheres. For example, a glass component in the form of the hydrolysis product of a precursor can adhere to particles by admixing the precursor of a glass component to a water-based solution comprising the above iron oxide particles. In an embodiment, a glass component can be deposited on the surface of the particles by the so-called sol-gel method by adding a precursor, desirably in the form of a solution, to the water-based solution containing the above iron oxide particles. An example of a precursor that is suitable for adhering of particles with a glass component is a silicon compound. A silane compound such as an alkoxysilane is desirably employed as the silicon compound. Silica ($SiO_2$) can adhere to the surface of the particles by hydrolyzing a silane compound. Among such compounds, the use of tetraethyl orthosilicate (TEOS), which can form silica by the sol-gel method, is desirable. As needed, a base can be added with the glass component precursor to promote hydrolysis of the glass component precursor. Examples of bases are sodium hydroxide, potassium hydroxide, sodium carbonate, and ammonia water. The use of sodium hydroxide is desirable in that it can achieve basic conditions with just a small quantity. From the perspective of little dissolution of the glass component that adheres to the particles, the use of a weak base such as ammonia water is suitable. The quantity of base employed is not specifically limited. The quantity of glass component precursor that is added to the above water-based solution is, for example, a quantity falling within a range of 0.05 mole percent to 2.0 mole percent, desirably a quantity falling within a range of 0.05 mole percent to 0.4 mole percent, per 1 mole of iron constituting the starting material particles.

Following the first adhering treatment, the particles can be subjected to steps such as washing and drying. Alternatively, they can be subjected to the second adhering treatment as is.

The second adhering treatment is a treatment in which the iron oxide particles that have been subjected to the first adhering treatment are subjected to adhering with an alkaline earth metal. The second adhering treatment in a water-based solution can be conducted by adding an alkaline earth metal salt to the solution containing the iron oxide particles that have been subjected to the first adhering treatment and adhering it to the surface of the particles. Further, it can also be conducted by admixing with the solution the precursor of an alkaline earth metal salt and an additional component to convert the precursor into the alkaline earth metal salt. Based on the latter method, the precursor of the alkaline earth metal salt can be converted into an alkaline earth metal salt by a reaction such as salt formation, neutralization, or hydrolysis and the alkaline earth metal salt can adhere to the particle surface. The solution containing the iron oxide particles that have been subjected to the first adhering treatment is desirably a solution in which iron oxide particles that have been subjected to the first adhering treatment are dispersed. The surfactant can contribute to obtaining such a solution.

In the latter method, for example, the precursor of an alkaline earth metal salt and an additional component for converting the precursor into the alkaline earth metal salt can be admixed to the solution and stirring can be conducted to cause the alkaline earth metal salt to adhere to the iron oxide particles to which a glass component adheres in the solution. Examples of the additional component are salts containing anionic components capable of forming alkaline earth metal salts of lower solubility in the solution than the anionic component that is contained in the precursor by forming salts with alkaline earth metal cations. For example, when conducting the alkaline earth metal salt adhering treatment in an aqueous solution or in a water-based solution containing water as the principal solvent, a water-soluble salt such as an alkaline earth metal nitrate or chloride can be employed as the precursor and an alkaline metal carbonate can be employed as the additional component to cause an alkaline earth metal carbonate to adhere to the surface of the particles. The above reaction is desirably conducted under basic conditions from the perspective of achieving smooth conversion of the precursor into the alkaline earth metal salt. Examples of the base that is added to the solution to render it basic are sodium hydroxide, potassium hydroxide, sodium carbonate, and ammonia water. From the perspective of achieving basic conditions with just a small quantity, the use of sodium hydroxide is desirable. From the perspective of little dissolution of the glass component that adheres to the particles, the use of a weak base in the form of ammonia water is suitable. Further, by bubbling carbon dioxide through the solution after converting the precursor of the alkaline earth metal salt into an alkali such as a hydroxide in the basic solution, it is possible to cause alkaline earth metal carbonate to precipitate and adhere to the particles.

Unsubstituted hexagonal ferrite is a metal oxide denoted by $AFe_{12}O_{19}$. In the formula, A denotes an alkaline earth metal such as barium, strontium, calcium, or lead. There are some hexagonal ferrites in which a portion of the metal element is replaced with a substitute element. Substitute elements will be described further below.

For example, hexagonal ferrite in which A denotes barium is barium ferrite. To make it possible to obtain hexagonal ferrite by causing ferrite conversion to progress after the alkaline earth metal contained in the adhering matter has been pickup up in the particle, it suffices to determine the type of the alkaline earth metal that is applied as an adhering matter based on the composition of the desired hexagonal ferrite. For example, barium ferrite can be obtained by forming an adhering matter containing barium. Further, it is possible to obtain strontium ferrite by employing strontium, and calcium ferrite by employing calcium.

Examples of optional elements that can constitute the hexagonal ferrite along with iron and the alkaline earth metal are Co, Al, Ti, Zn, and the like. For example, the coercive force can be adjusted by adding Ti or Zn. These optional elements can be caused to adhere to the iron oxide particles either before or after adhering with the glass component. For example, since hydroxides and carbonates of Co, Al, Ti, and Zn may have poor solubility in water and settle (precipitate) out of aqueous solutions, these elements can be caused to adhere to the iron oxide particles in a water-based solution as hydroxides or carbonates.

The iron oxide particles that have been subjected to adhering with an adhering matter containing a glass component and an alkaline earth metal after adhering with a surfactant as set forth above can be, as needed, subjected to processing such as removal from the solution, washing, drying, and pulverization, and then subjected to calcination. Pulverization can permit uniform calcination and facilitate the removal of the adhering matter after calcination.

The calcination can be conducted at a temperature of 500° C. to 1,000° C., for example. In the steps after calcination in the present invention, known techniques relating to the manufacturing of hexagonal ferrite, such as the coprecipitation method and reverse micelle method, can be applied.

In the above manufacturing method, when the particles are analyzed by X-ray diffraction following calcination, hexagonal ferrite is detected as the main component. The phrase "hexagonal ferrite is detected as the main component" means that the peak of maximum intensity in the X-ray diffraction spectrum is a peak derived from the crystalline structure of hexagonal ferrite. As set forth above, since ferrite conversion can proceed smoothly, it is possible to obtain particles in which hexagonal ferrite is detected as the main component.

The adhering matter may remain on the surface of the particles following calcination. The adhering matter can be removed or left in place. The adhering matter is desirably removed to enhance the magnetic characteristics of the magnetic particles. The adhering matter can be dissolved away, for example, by the method of immersing the particles in a basic solution such as sodium hydroxide (alkali washing) or hydrofluoric acid (HF). Alkali washing is desirably employed due to the difficulty of handling hydrofluoric acid.

The method of manufacturing hexagonal ferrite magnetic particles set forth above can prevent the aggregating of particles due to sintering during calcination, thereby yielding fine hexagonal ferrite. For example, the above manufacturing method can yield fine hexagonal ferrite magnetic particles that are suitable as a magnetic material in magnetic recording media for high-density recording and that have a particle size ranging from 10 nm to 20 nm.

A further aspect of the present invention can provide hexagonal ferrite magnetic particles provided by the above manufacturing method.

Since the above hexagonal ferrite magnetic particles are obtained by the above manufacturing method, they can be fine particles with a particle size ranging from 10 nm to 20 nm, for example. Such a fine magnetic material is suitable as a magnetic material for magnetic recording.

The above hexagonal ferrite magnetic particles can be mixed with binder and solvent to prepare a coating liquid and the coating liquid can be coated on a support to form a magnetic layer. Accordingly, the above hexagonal ferrite magnetic particles are suitable for use in particulate magnetic recording media.

That is, a further aspect of the present invention can yield a magnetic recording medium, comprising a magnetic layer comprising ferromagnetic powder and binder on a nonmagnetic support, in which the above hexagonal ferrite magnetic particles are the above ferromagnetic powder. The magnetic recording medium can have a multilayered structure sequentially comprising, on a nonmagnetic support, a nonmagnetic layer comprising nonmagnetic powder and binder, and a magnetic layer comprising the above hexagonal ferrite magnetic particles and binder. A backcoat layer can be present on the opposite surface of the nonmagnetic support of the magnetic recording medium from the surface on which the magnetic layer is present. Known techniques relating to magnetic recording media can be applied to the manufacturing of the magnetic recording medium employing the above hexagonal ferrite magnetic particles.

EXAMPLES

The present invention will be described in detail below based on Examples. However, the present invention is not limited to Examples. The term "percent" given in Examples is weight percent and the ratio given in Examples is a weight ratio.

Example 1

Procedure 1

Processing with Dispersing Adjuvant

Water was added to 5 g of iron oxide (hematite) particles with an average particle size of 15 nm to completely wet them. In that state, 0.2 mL of oleylamine and 0.2 mL of oleic acid were added and the mixture was mixed while being kneaded in a mortar. Subsequently, the mixture was transferred to a Teflon (registered trademark) flask. The kneaded product adhering to the mortar was moved to the Teflon flask while being diluted with water.

The quantity of water employed in procedure 1 was 105 g.

Procedure 2

Surfactant Adhering Treatment

To the water-based solution containing iron oxide particles prepared in procedure 1 were added 1.5 g of surfactant in the form of cetyltrimethylammonium bromide (CTAB) and 15 g of chloroform. The mixture was then stirred for a day and a night with a stirring blade.

Procedure 3

First Adhering Treatment (Glass Component Adhering Treatment)

To the solution prepared in procedure 2 were added 1.5 mL of 2.5 percent ammonia water and 1 g of tetraethyl orthosilicate (TEOS) diluted with 1 percent butanol and the mixture was stirred for another day and night. The TEOS was then hydrolyzed, causing the silica to adhere to the surface of the iron oxide particles to which CTAB adheres.

Procedure 4

Second Adhering Treatment (Alkaline Earth Metal Salt Adhering Treatment)

The solution obtained in procedure 3 was centrifuged, the supernatant was discarded, and the product was redispersed in 112 g of water. To 14.6 g of a 5 percent aqueous solution of barium nitrate was added 0.67 mL of 25 percent ammonia water, and the mixture was stirred. To this was then admixed the redispersed liquid.

Subsequently, 53.4 g of a 5 percent aqueous solution of sodium carbonate was added and the mixture was stirred for a day and a night.

In this manner, particles were obtained in which silica and barium carbonate adhere to the surface of iron oxide particles to which CTAB already adheres.

Procedure 5

Heat Treatment

The solution obtained in procedure 4 was centrifuged and the supernatant was discarded. The product was dried and somewhat pulverized in a mortar. The powder thus obtained was heat treated for 15 minutes at a heating temperature of 800° C. while delivering air at 1 L/min in an image furnace made by ULVAC-Riko.

Procedure 6

Removing the Adhering Matter

The heat-treated powder obtained in procedure 5 was irradiated with ultrasound for 2 hours at 60° C. in a 5N NaOH aqueous solution. Subsequently, the powder was maintained for one hour at 80° C. and then left standing for a day and a night while cooling in a location at room temperature in processing to remove the adhering matter from the particle surface. Next, centrifuging was conducted. The precipitate was recovered, redispersed in water, and washed by centrifuging. Subsequently, the precipitate was air dried.

Comparative Example 1

With the exception that barium carbonate was caused to adhere without CTAB and silica adhering treatments, the same processing was conducted as in Example 1.

Comparative Example 2

With the exception that the CTAB adhering treatment of procedure 2 was not carried out, the same processing was conducted as in Example 1.

Evaluation Methods (1) X-Ray Diffraction

The powders obtained in Example 1 and Comparative Examples 1 and 2 were analyzed by powder X-ray diffraction with an X' Pert PRO (CuKα radiation source, 45 kV voltage, 40 mA current) made by PANalytical Corp.

In the powders obtained in Example 1 and Comparative Example 1, hexagonal barium ferrite was detected as the main component by X-ray diffraction analysis.

By contrast, for the powder obtained in Comparative Example 2, hematite was detected as the main component by X-ray diffraction analysis.

(2) Magnetic Characteristics

The coercive force Hc of the powders obtained in Example 1 and Comparative Example 1 was measured with a Vibrating Superconducting Magnetometer (VSM) made by Tamakawa Co., Ltd.

(3) Particle Size Measurement

The average particle size (average plate diameter) of the powders obtained in Example 1 and Comparative Examples 1 and 2 was measured by the method set forth above with a transmission electron microscope.

TABLE 1

| | CTAB adhering treatment | Silica adhering treatment | Barium carbonate adhering treatment | Hc | Main component detected by X-ray diffraction analysis | Average plate diameter (nm) |
| --- | --- | --- | --- | --- | --- | --- |
| Ex. 1 | Conducted | Conducted | Conducted | 159 kA/m (2000 Oe) | BaFe | 12 |
| Comp. Ex. 1 | Not conducted | Not conducted | Conducted | 199 kA/m (2500 Oe) | BaFe | 40 |
| Comp. Ex. 2 | Not conducted | Conducted | Conducted | — | Hematite | 40 |

Evaluation Results

Comparative Example 1 is an example in which iron oxide particles to which barium carbonate adhered without adhering with CTAB or silica were subjected to calcination. As shown in Table 1, the conversion into ferrite proceeded smoothly and hexagonal barium ferrite magnetic particles were obtained. However, the particles obtained were large.

Additionally, Comparative Example 2 is an example in which iron oxide particles to which silica and barium carbonate adhered without adhering with CTAB were subjected to calcination. Conversion into ferrite did not proceed smoothly during calcination, and no barium ferrite was obtained.

By contrast, as shown in Table 1, fine hexagonal barium ferrite magnetic particles were obtained in Example 1. Since the coercive force measured in Example 1 was similar to the coercive force in Comparative Example 1, it was determined that no decline in magnetic characteristics due to the various adhering treatments had occurred.

Based on the above results, an aspect of the present invention was found to provide hexagonal ferrite magnetic particles in the form of fine particles having good magnetic characteristics.

It was possible to provide a magnetic recording medium for high-density recording exhibiting good electromagnetic characteristics using the hexagonal ferrite magnetic particles thus obtained as ferromagnetic powder in the magnetic layer.

An aspect of the present invention is useful in the field of manufacturing magnetic recording media.

Although the present invention has been described in considerable detail with regard to certain versions thereof, other versions are possible, and alterations, permutations and equivalents of the version shown will become apparent to those skilled in the art upon a reading of the specification and study of the drawings. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any Examples thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

What is claimed is:

1. A method of manufacturing hexagonal ferrite magnetic particles, which comprises:
    applying, in a water-based solution, an adhering matter comprising a glass component and an alkaline earth metal to iron oxide particles to which a surfactant adheres; and
    calcining the iron oxide particles to which the adhering matter adheres to obtain a calcined product in which a main component that is detected by X-ray diffraction analysis is hexagonal ferrite.

2. The method of manufacturing hexagonal ferrite magnetic particles according to claim 1, which comprises subjecting the iron oxide particles to adhering with the adhering matter by:
    conducting a first adhering treatment in which iron oxide particles to which a surfactant adheres are subjected to adhering with a glass component; and
    conducting a second adhering treatment in which the iron oxide particles after the first adhering treatment are subjected to adhering with an alkaline earth metal.

3. The method of manufacturing hexagonal ferrite magnetic particles according to claim 1, wherein the glass component is a hydrolysis product of a silicon compound.

4. The method of manufacturing hexagonal ferrite magnetic particles according to claim 3, wherein the silicon compound is alkoxysilane.

5. The method of manufacturing hexagonal ferrite magnetic particles according to claim 3, wherein the silicon compound is tetraethyl orthosilicate.

6. The method of manufacturing hexagonal ferrite magnetic particles according to claim 2, wherein the first adhering treatment is conducted by adding a precursor of the glass component to a water-based solution comprising iron oxide particles to which a surfactant adheres and conducting stirring, to subject the iron oxide particles to adhering with the glass component in the form of a hydrolysis product of the precursor.

7. The method of manufacturing hexagonal ferrite magnetic particles according to claim 1, wherein the surfactant is a quaternary ammonium base-containing compound.

8. The method of manufacturing hexagonal ferrite magnetic particles according to claim 1, wherein the surfactant is a salt of a quaternary ammonium cation and a halogen anion.

9. The method of manufacturing hexagonal ferrite magnetic particles according to claim 1, wherein the surfactant is cetyltrimethylammonium halide.

10. The method of manufacturing hexagonal ferrite magnetic particles according to claim 1, wherein the glass component is a hydrolysis product of tetraethyl orthosilicate and the surfactant is cetyltrimethylammonium halide.

11. The method of manufacturing hexagonal ferrite magnetic particles according to claim 2, wherein the second adhering treatment is a treatment by which iron oxide particles after the first adhering treatment are subjected to adhering with an alkaline earth metal in the form of a salt by adding a precursor of an alkaline earth metal salt and an additional component for converting the precursor into an alkaline metal earth salt to a solution comprising iron oxide particles after the first adhering treatment and conducting stirring.

12. The method of manufacturing hexagonal ferrite magnetic particles according to claim 11, wherein the alkaline metal earth in the form of a salt is a carbonate.

13. The method of manufacturing hexagonal ferrite magnetic particles according to claim 11, wherein the alkaline metal earth in the form of a salt is barium carbonate, the glass component is a hydrolysis product of alkoxysilane, and the surfactant is a quaternary ammonium base-containing compound.

14. The method of manufacturing hexagonal ferrite magnetic particles according to claim 11, wherein the alkaline metal earth in the form of a salt is barium carbonate, the glass component is a hydrolysis product of tetraethyl orthosilicate, and the surfactant is cetyltrimethylammonium halide.

15. The method of manufacturing hexagonal ferrite magnetic particles according to claim 11, wherein a base is added in addition to the precursor of the alkaline earth metal salt and the additional component.

16. The method of manufacturing hexagonal ferrite magnetic particles according to claim 11, wherein the alkaline earth metal is barium.

17. The method of manufacturing hexagonal ferrite magnetic particles according to claim 1, which further comprises subjecting the hexagonal ferrite magnetic particles obtained following the calcining to a step of removing the adhering matter.

18. The method of manufacturing hexagonal ferrite magnetic particles according to claim 17, wherein the adhering matter is dissolved away by a base.

* * * * *